United States Patent [19]

Marcus

[11] Patent Number: 4,494,841
[45] Date of Patent: Jan. 22, 1985

[54] ACOUSTIC TRANSDUCERS FOR ACOUSTIC POSITION SENSING APPARATUS

[75] Inventor: Michael A. Marcus, Fairport, N.Y.

[73] Assignee: Eastman Kodak Company, Rochester, N.Y.

[21] Appl. No.: 531,375

[22] Filed: Sep. 12, 1983

[51] Int. Cl.³ .................. G03B 7/24; G03B 17/00; H04R 17/00
[52] U.S. Cl. .................. 354/21; 354/217; 354/289.1; 367/93; 340/675; 310/800
[58] Field of Search .............. 354/21, 215, 217, 218, 354/286, 289.1, 289.12; 352/78 C, 172; 367/93; 340/675; 310/800

[56] References Cited

U.S. PATENT DOCUMENTS

| | | | |
|---|---|---|---|
| 3,694,800 | 9/1972 | Frank | 340/1 |
| 3,798,959 | 3/1974 | Bowles et al. | 73/37.5 |
| 3,914,754 | 10/1975 | Kirk | 340/267 |
| 4,049,954 | 9/1977 | Da Costa Vieira et al. | 235/151.32 |
| 4,175,441 | 11/1979 | Urbanek et al. | 73/599 |
| 4,285,053 | 8/1981 | Kren et al. | 367/99 |
| 4,356,422 | 10/1982 | van Maanen | 310/800 X |
| 4,383,194 | 5/1983 | Ohigashi et al. | 310/800 X |

Primary Examiner—William B. Perkey
Attorney, Agent, or Firm—Thomas H. Close

[57] ABSTRACT

To improve mass productivity of acoustic position sensing apparatus of the type wherein the position of an object is sensed with respect to a sensing port in an acoustic resonator, acoustic transducers for generating an acoustic signal in the resonator and for sensing the acoustic signal in the resonator comprise a sheet of poled piezoelectric material having electrodes on opposite sides thereof. The sheet is fixed over a transducer port in the acoustic resonator. Mass productivity is further improved by integrating a plurality of such acoustic transducers on a sheet of piezoelectric material by appropriately patterning the electrodes thereon.

30 Claims, 11 Drawing Figures

ACOUSTIC TRANSDUCERS FOR ACOUSTIC POSITION SENSING APPARATUS

BACKGROUND OF THE INVENTION

1. Field of the Invention

The invention relates to position sensing apparatus and more particularly, to acoustic transducers for use in acoustic position sensing apparatus.

2. Description of the Prior Art

Position sensors for producing an electronic signal representing the position of an object are essential parts of many complex electromechanical devices. Examples of the use of such position sensors abound, in everything from automobiles to photographic cameras. In many such applications, non-contact position sensing is desired, where mechanical contact could damage the object, such as a photographic film in a camera, or impede a delicate movement, such as the movement of a shutter blade in a photographic camera.

One type of non-contact position sensor shown in U.S. Pat. No. 3,694,800 issued Sept. 26, 1972 to L. F. Frank, employs the physical principle that the resonant frequency of an acoustic resonator having a port changes as a function of the obstruction of the port. The position sensing apparatus includes a "Y" shaped tube for defining an acoustic resonator. A first acoustic signal generating transducer (e.g. a loud speaker) is connected to one branch of the "Y" shaped tube for generating an acoustic signal of predetermined frequency in the acoustic resonator. The stem of the "Y" shaped tube is open, to define a sensing port. The resonant frequency of the acoustic resonator varies as a function of the position of an object near the sensing port. An acoustic signal sensing transducer (e.g. a microphone) is connected to the other branch of the "Y" shaped tube, and produces a signal representing the resonant condition in the acoustic resonator. Depending upon the size of the resonator, the size of the sensing port, and the frequency of the acoustic signal generator, the signal produced by the second acoustic transducer will be a maximum when the sensing port is completely unobstructed (open tube resonance), or completely covered (closed tube resonance). Signal processing electronics responsive to the signal produced by the acoustic sensing transducer produces a signal representative of the position of an object with respect to the sensing port. In the acoustic position sensing apparatus shown in the aforementioned U.S. patent, the acoustic signal transducers comprise acoustic transducers of the type used in hearing aids.

A problem encountered in employing such prior art acoustic position sensors in small mass produced apparatus such as photographic cameras is the difficulty in mass producing the acoustic transducers and incorporating the transducers in small areas, due to their physical size and complexity. Although the signal processing electronics are readily miniaturized and mass produced using well known electronic miniaturization techniques, it would not be readily apparent how the acoustic transducers could be simplified to be easily mass produced and miniaturized.

This problem becomes particularly acute when one attempts to employ a number of acoustic position sensors in one apparatus.

The object of the invention is to provide acoustic transducers for acoustic position sensing apparatus that are simply constructed and that have improved mass productivity, and are easily miniaturized for employment in compact mass produced apparatus.

SUMMARY OF THE INVENTION

According to the present invention, there is provided acoustic transducers for acoustic position sensing apparatus comprising a sheet of suitably poled piezoelectric material (preferably polymeric material such as polyvinylidene fluoride) having electrodes on opposite sides thereof. The sheet is fixed over a transducer port(s) in an acoustic resonator. A plurality of acoustic transducers are integrated on a single sheet of piezoelectric material by patterning the electrodes thereon.

In one embodiment of the invention, the acoustic resonator comprises a body of material having a pair of spaced-apart cylindrical holes through the thickness of the material. The holes converge near one side of the body to define a V-shaped cavity. The vertex of the V opens onto one surface of the body to form a sensing port. The legs of the V open on an opposite surface of the body to form transducer ports. The acoustic transducers are formed side-by-side on the sheet of polymeric piezoelectric material, such that when the sheet is fixed to the surface of the body having the transducer ports, one transducer is positioned over each transducer port.

In another embodiment of the invention, the acoustic resonator is defined by a cylindrical hole through the thickness of a body of material. One end of the hole defines the sensing port, and both acoustic transducers are fixed over the other end of the cylindrical hole, one on top of the other.

In one application of the invention for use in a photographic camera, the transducers for an acoustic film notch sensor, a plurality of cartridge notch sensors, and an audio signal emitter are integrated on a single sheet of polymeric piezoelectric material.

BRIEF DESCRIPTION OF THE DRAWINGS

The invention will be described with reference to the accompanying drawings, wherein.

DESCRIPTION OF THE PREFERRED EMBODIMENTS

Figure 1:
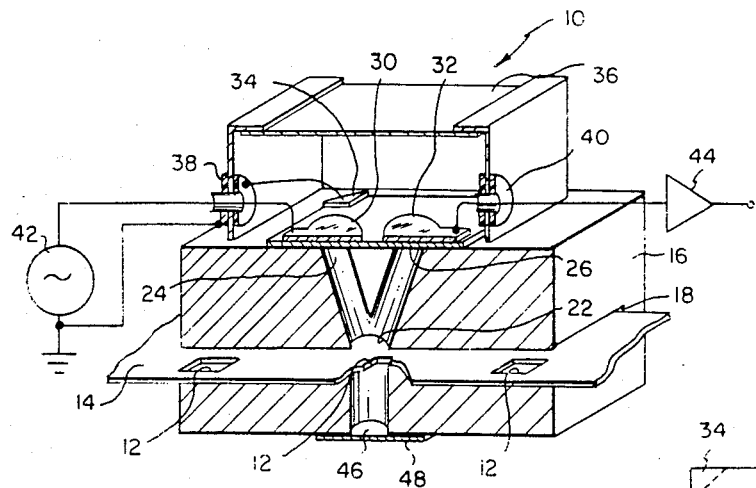
FIG. 1 is a perspective cross-sectional view of acoustic position sensing apparatus for detecting film perforations according to the present invention.

An acoustic position sensing apparatus having improved acoustic transducers according to the present invention is shown in FIG. 1. The acoustic position sensing apparatus, generally designated 10, is configured for detecting perforations 12 in a strip of film 14. The apparatus comprises a body of material 16 (e.g. plastic or metal) defining a film guide slot 18 and an acoustic resonator 20. The acoustic resonator is defined by a pair of cylindrical holes which converge to meet at a vertex to define a V-shaped cavity, with a sensing port 22 at the vertex of the V, opening into the film guide slot, and a pair of transducer ports 24 and 26 at the ends of the arms of the V. A sheet 28 of poled piezoelectric material, preferably a polymeric piezoelectric material such as polyvinylidene fluoride ($PVF_2$), alternatively a composite material comprising a ceramic in a polymeric binder, is fixed over the transducer ports 24 and 26, for example by an adhesive.

Figure 2:
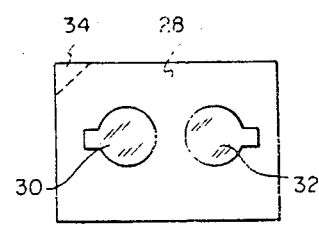
FIG. 2 is a plan view of a sheet of piezoelectric material employed in the acoustic position sensing apparatus shown in FIG. 1.

FIG. 2 shows a plan view of the sheet of piezoelectric material 28. Two regions of the sheet of material are electrically addressable by means of a pair of patterned electrodes 30 and 32 on the top of the sheet, and an unpatterned electrode (not shown) on the bottom of the sheet. The regions of the sheet 28 beneath the patterned electrodes are rendered piezoelectrically active (poled) by applying a high voltage to the electrodes for a predetermined time at a predetermined temperature as is well known in the art. Alternatively, the entire sheet is poled prior to forming the patterned electrodes. The sheet of piezoelectric material 28 is fixed over the transducer ports 24 and 26 of the acoustic resonator 20 so that the regions of the sheet covered by the patterned electrodes are positioned over the ports. A corner 34 of the sheet is folded over and fixed with adhesive as shown in FIG. 1, to allow contact to be made to the backside electrode. A conductive cover 36 is placed over the transducers. A pair of coaxial connectors 38 and 40 are mounted in the sides of the cover 36. The cover itself, the ground leads of the coaxial connectors, and the backside electrode of sheet 28 are grounded, thereby providing electromagnetic interference shielding for the transducers. Electrode 30 is connected to an acoustic frequency generator 42 through connector 38. Electrode 32 is connected to an amplifier 44 through connector 40. Directly opposite sensing port 22 is a back cavity 46, formed by a cylindrical hole covered on one end by a piece of tape 48.

In operation, an acoustic signal is applied by oscillator 42 to electrode 30 thereby causing the piezoelectrically active region under electrode 30 to vibrate over transducer port 24 to generate an acoustic signal in the acoustic resonator 20. The acoustic signal in acoustic resonator 20 is sensed by the piezoelectrically active region of sheet 28 fixed over transducer port 26 thereby generating an electrical signal proportional to the strength of the acoustic signal in acoustic resonator 20, on electrode 32. The signal on electrode 32 is amplified by amplifier 44. When the frequency of the acoustic signal in the acoustic resonator 20 is at the resonant frequency of the resonator, the sensed signal will be a maximum. The resonant frequency of the acoustic resonator is a function of the extent to which sensing port 22 is covered or uncovered. The frequency of the acoustic signal is chosen to coincide with the resonant frequency of the acoustic resonator when the sensing port is covered. Alternatively, the frequency of the acoustic signal is chosen to coincide with the resonant frequency of the acoustic resonator when the sensing port is uncovered. The output of amplifier 44 is a function of the position of a film perforation 12 with respect to sensing port 22.

The acoustic position sensing apparatus described above was constructed by drilling a pair of 1 mm diameter holes at 45° angles to define a V-shaped cavity in an 8.5 mm thick sheet of plexiglass. The polymeric piezoelectric sheet, was 25 micron thick, biaxially stretched, $PVF_2$ with 1000 Å thick aluminum electrodes vapor deposited through a mask. The diameters of the top electrodes 30 and 32 were 3 mm. The resonant frequency of the open cavity, i.e. with a perforation present, was 14.7 kHz. The resonant frequency was determined by varying the frequency of oscillator 42 until a maximum signal was detected on electrode 32. A 14.7 kHz, 10 volt square wave was applied to electrode 30 by oscillator 42. When a film perforation was present at the sensing port 22, the input to the amplifier 44 was 0.09 mV. When no perforation was present, i.e. with film over the sensing port 22, the input to the amplifier 44 was 1.96 mV.

When back cavity 46 was opened by removing the piece of tape 48, a resonance was observed at 26.75 kHz with no film present at the sensing port 22. Under these conditions, when a 26.75 kHz 10 volt square wave was applied to electrode 30, the input to the amplifier 44 was 0.23 mV. When film was present between sensing port 22 and back cavity 46, the input to the amplifier 44 was 1.32 mV.

With this small, simple and easily mass produced apparatus, film perforations are accurately and reliably sensed. Besides being used as a perforation sensor, acoustic position sensing apparatus may also be used as edge detectors, distance sensors, or a non-contact thickness guage by placing an acoustic position sensor on both sides of a sheet of material and observing the difference in the signals from the two sensors. If the output of amplifier 44 is applied to a trigger circuit such as a Schmidt trigger, the output of the apparatus becomes a logical binary signal, suitable for use for example as a noncontact switch to indicate the presence or absence of an object covering the sensing port.

Figure 3:
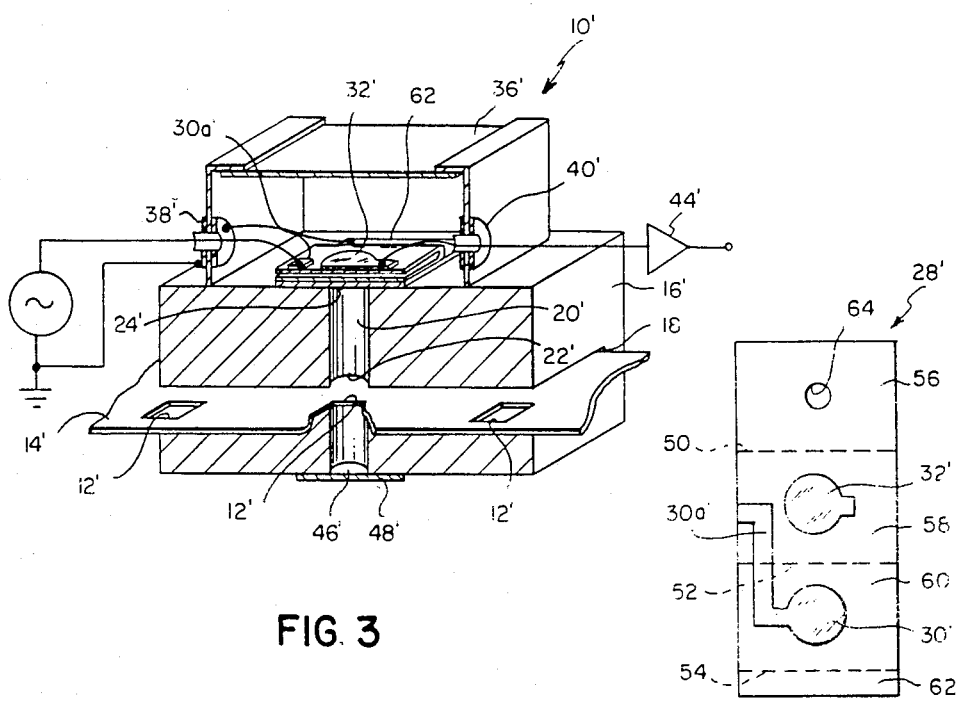
FIG. 3 is a perspective cross-sectional view of an alternative embodiment of acoustic position sensing apparatus for detecting perforations in film.
Figure 4:
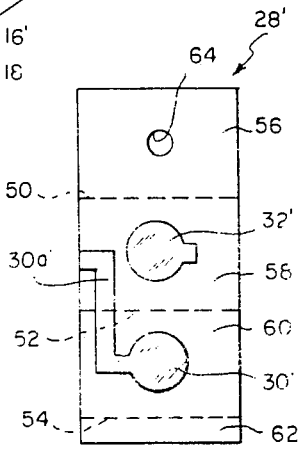
FIG. 4 is a plan view showing the electrode structure on a sheet of piezoelectric material employed in the apparatus of FIG. 3.

FIG. 3 shows an alternative embodiment of acoustic position sensing apparatus having acoustic transducers according to the present invention, where elements analogous to elements in FIG. 1 are similarly numbered, with primes ('). In the apparatus 10' shown in FIG. 3, the regions of the sheet of piezoelectric material 28' covered by patterned electrodes, comprising the acoustic transducers, are stacked over a single transducer port 24' in the acoustic resonator 20', thereby further simplifying the construction of the device and reducing its size. FIG. 4 shows the electrode pattern on one side of the sheet 28' of piezoelectric material. The other side of the sheet is fully covered by an electrode. The sheet 28' is divided, as shown by phantom lines 50, 52, and 54, into four leaves 56, 58, 60, and 62. A hole 64 having substantially the same diameter as transducer port 24' is formed in leaf 56. An electrode 32' is formed on leaf 58;

an electrode 30' is formed on leaf 60. Electrode 30' includes a conductor leg 30a' that extends onto leaf 58 from leaf 60.

When assembled, leaf 56 is folded back and down (as seen in FIG. 4) along line 50 so that hole 64 is substantially aligned with the center of electrode 32'. Next, leaf 60 is folded back and up along line 52 so that electrodes 30' and 32' are in substantial alignment. In the folded stack, electrode 32', conductor leg 30a', and the backside electrode on flap 62 are all accessible from the same side of the stack. In assembling the stacked transducer, adhesive is used to hold the contacting surfaces together. Leaf 56 with hole 64 forms an air gap between the two transducer regions of the sheet, thereby improving the acoustic coupling between these regions. The apparatus has been found to work without this spacer, but operation is improved by its presence.

The stacked transducer assembly is then fixed over the single transducer port 24', as shown in FIG. 3, such that electrode 30' is on the bottom in contact with the top surface of block 16'. Electrode 32', a portion of the backside electrode, and conductor extension 30a' of electrode 30' are exposed for making electrical connections. Electrode 30' is connected to the acoustic frequency generator 42' via coaxial connector 38'. The backside electrode is connected to ground through the grounded side of coaxial connector 38', and electrode 32' is connected to amplifier 44' through coaxial connector 40'.

An acoustic position sensor having a stacked transducer configuration as shown in FIG. 3, was constructed using 1 mil thick biaxially stretched polyvinylidene fluoride sheet with 3 mm diameter evaporated aluminum electrodes. The acoustic resonator was constructed by drilling a 1 mm diameter hole perpendicularly through the thickness of an 8.5 mm thick piece of plexiglass. When a sine wave generator was connected to the bottom electrode 30', open tube resonances were observed at 7.57 kHz and 19.7 kHz, and a closed tube resonance was observed at 12.5 kHz.

A 23 volt sine wave input having a frequency of 7.57 kHz was applied to the bottom electrode, and the observed input to the sensing amplifier 44' was 1.8 mV with no film present (i.e. at a perforation), and 0.9 mV amplifier input was observed with film present at the sensing port 22'. With a 12.5 kHz sine wave input, the amplifier input observed was 0.9 mV with no film present, and 1.9 mV with film present. At 19.7 kHz, the amplifier input was 2.1 mV with no film present, and 1.1 mV with film present. The approximately 2:1 on/off ratios observed with the device make object position detection accurate and reliable.

Figure 5:
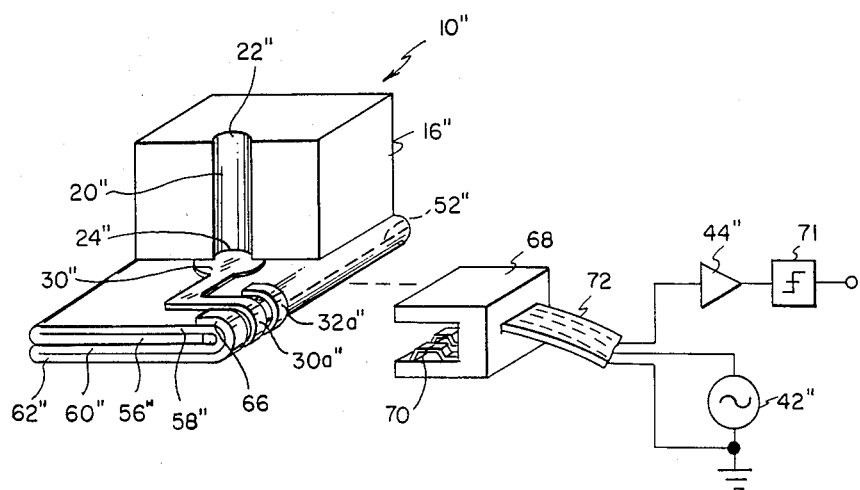
FIG. 5 is a perspective partial cross-sectional view of a further alternative embodiment of acoustic position sensing apparatus.

FIG. 5 shows a further alternative embodiment of the acoustic position sensing apparatus having a stacked, folded transducer structure, further simplified by integrating an electromagnetic interference shield into the folded sheet structure. Elements of the device shown in FIG. 5 analogous to the previously described devices are similarly numbered with double primes (").

Figure 6:
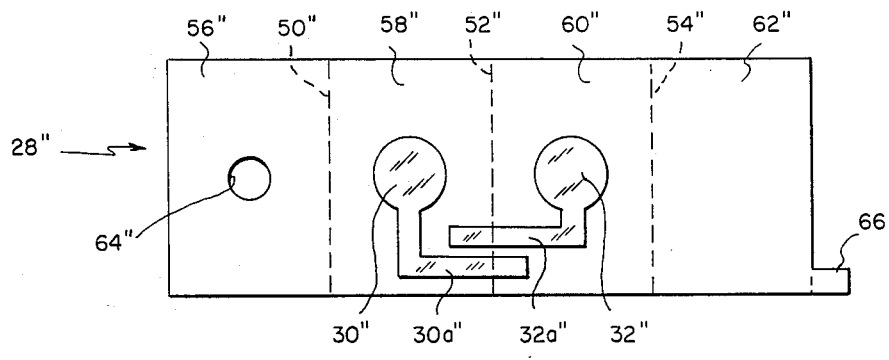
FIG. 6 is a plan view showing the electrode structure on a sheet of piezoelectric material employed in the apparatus of FIG. 5.

FIG. 6 illustrates the electrode pattern on the sheet of piezoelectric material 28". The sheet is divided by phantom fold lines 50", 52", and 54" into four leaves 56", 58", 60", and 62". Leaf 56" is provided with a central aperture 64" substantially the same size as transducer port 24" in acoustic resonator 20" (see FIG. 5). Leaf 58" carries an electrode 30" having a conductor extension 30a" that extends slightly across fold line 52" onto leaf 60". Similarly, leaf 60" carries an electrode 32" having a conductor extension 32a" that extends slightly across fold line 52" onto leaf 58". Leaf 62" is substantially narrower than leaves 58" and 60" and is provided with a tab 66, the purpose of which is explained below. The backside of sheet 28" is covered by one substantially unpatterned electrode.

During assembly, leaf 56" is folded back and to the right, as seen in FIG. 6, so that hole 64" is in substantial alignment with the center of electrode 30". Leaf 58" is then folded back and to the right along fold line 52" so that the electrodes 30" and 32" are in substantial alignment, with hole 64" in between them. Next, leaf 62" is folded forward and to the left along line 54". Finally, tab 66 is folded around the edge at fold line 52". When the unpatterned backside electrode is grounded, the electrode on leaf 62" provides the shielding from electromagnetic interference for electrode 32". After assembly, conductor extensions 30a" and 32a" are electrically accessible by a flat cable connector 68 (see FIG. 5) along fold line 52". Tab 66 is folded over fold line 52" as shown in FIG. 5, to provide electrical access to the unpatterned backside electrode. Connector 68 is provided with spring loaded contacts 70 in a known manner to make electrical contact with the extensions 30a" and 32a" of the patterned electrodes, and the unpatterned backside electrode.

Electrode 30" is connected via one conductor in a flat, multiple-conductor cable 72 to acoustic generator 42". Electrode 32" is connected via cable 72 to amplifier 44".

To illustrate the use of the acoustic position sensing apparatus shown in FIG. 5 in a binary (on--off) mode, a Schmidt trigger 71 is shown connected to the output of amplifier 44". The trigger levels of the Schmidt trigger 71 are set to be between the respective outputs of amplifier 44" when sensing port 22 is fully covered, and when it is fully uncovered. The arrangement shown in FIG. 5 is particularly well adapted for use as a touch-sensitive switch, for example.

According to the present invention, mass productivity of the acoustic position sensor is further improved by integrating a number of acoustic transducers on a single sheet of polymeric piezoelectric material. For example, a rectangular or linear array of touch-sensitive switches employing the type of acoustic position sensor shown in FIG. 5 is made by appropriately repeating the electrode patterns shown in FIG. 6 and providing a body of material defining a number of acoustic resonators.

Figure 7:
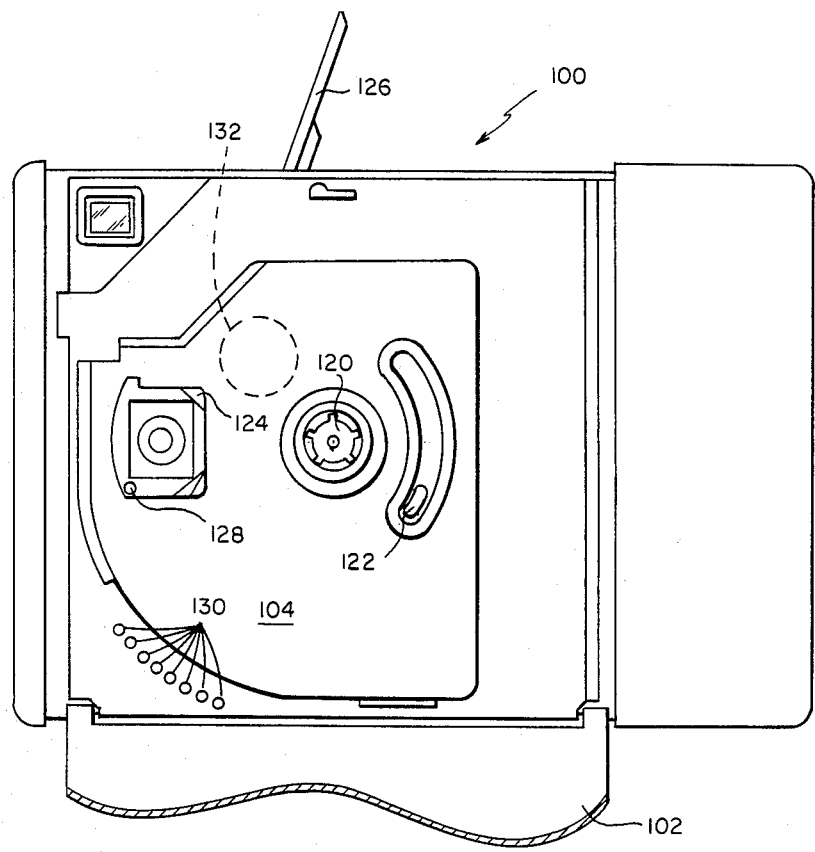
FIG. 7 is a plan view of the film-receiving chamber of a disc film camera having a plurality of acoustic position sensing apparatus.

FIG. 7 illustrates another application of the invention in a multiple integrated acoustic position sensing device employed, for example, in a photographic camera of the type adapted to expose disc film.

Figure 8:
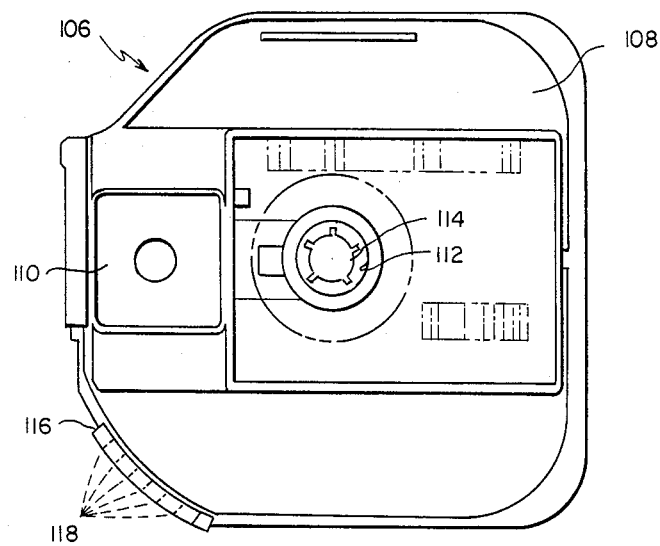
FIG. 8 is a plan view of a disc film cartridge useful in describing the operation of an acoustic film speed notch sensor included in the camera shown in FIG. 7.

A camera, generally designated 100 has a hinged film loading door 102 (partially shown in FIG. 7) that swings open to reveal a chamber 104 for receiving a disc film cartridge. A plan view of a disc film cartridge is shown in FIG. 8. The film cartridge 106 includes a protective housing 108 having an exposure window (not shown) located on the opposite side of the housing from a pressure pad area 110. A film drive hub 112 having a keyed aperture 114 is accessible from outside the cartridge for rotating a film disc inside the cartridge to bring successive exposure areas on the film disc into the exposure window. A vane 116 extending from protective housing 108 serves as a film speed indicator. The vane 116 is selectively truncated during manufacture of the film cartridge at any one of eight locations indicated by phantom lines 118 to code for eight possible film speeds ranging from ISO 40 to ISO 1000. Returning now to FIG. 7, the film chamber in the camera includes a film drive hub 120, a cartridge opening lever 122, and a lens block 124 adapted to project into the exposure window of the film cartridge to define the film plane of the camera. When the film loading door 102 is swung closed over the chamber 104, a camera latch lever 126 swings in a counterclockwise arc in the direction of arrow A to latch the door closed. The camera latch lever 126 is connected to cartridge opening lever 122 and moves the cartridge opening lever to uncover the exposure window in the cartridge after the film loading door is closed. The lens block 124 extends into the exposure window to contact the film disc in the cartridge. For further details on the operation of the disc camera, see U.S. Pat. No. 4,361,387, issued to R. P. Cloutier on Nov. 30, 1982.

Film frames around the periphery of the film disc are successively located in the exposure window of the film cartridge by rotating the film drive spindle 120 in engagement with the film drive hub 112. The film disc is provided with a series of peripheral notches that indicate the locations of the respective film frames on the disc. For further details of the film disc and cartridge, see U.S. Pat. No. 4,255,034, issued to Harvey et al on Mar. 10, 1981.

Film notches, such as the film frame location notches, are sensed by an acoustic film notch sensor having acoustic transducers according to the present invention. A sensing port 128 for the acoustic film notch sensor is provided in lens block 124. The film speed indicator vane 116 on film cartridge 106 is also sensed by an acoustic position sensor having acoustic transducers according to the present invention. Eight sensing ports 130 are provided for sensing film speed vane 116.

Figure 9:
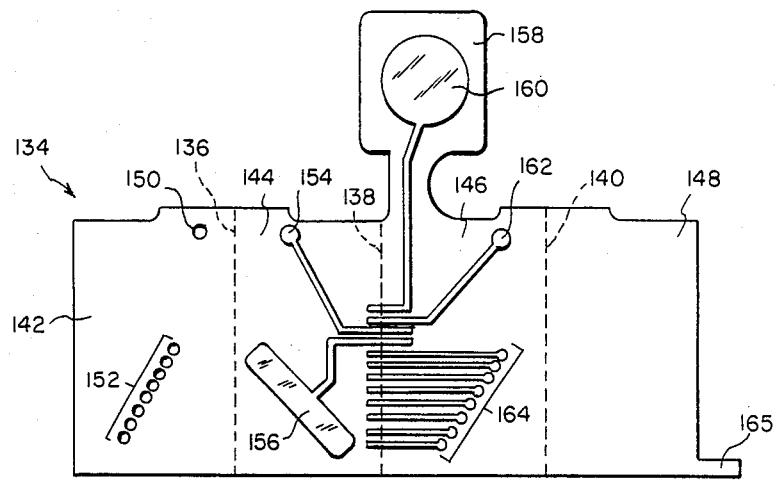
FIG. 9 is a plan view showing the electrode structure on a sheet of piezoelectric material comprising integrated acoustic transducers used in the camera shown in FIG. 7.

The disc camera shown in FIG. 7 is also provided with an audible signal for alerting the photographer to a photographic condition such as a light level too low for picture taking. The audible signal transducer comprises a polymeric piezoelectric transducer located inside the camera body in the region 132 outlined in phantom in FIG. 7. The plurality of acoustic transducers in the camera are integrated in a single sheet 134 of piezoelectric material. FIG. 9 is a plan view of the electrode pattern on one side of the sheet 134 of piezoelectric material. The other side of the sheet is covered by a substantially unpatterned electrode. When assembled, the sheet is folded along fold lines 136, 138 and 140 to form a stacked transducer configuration. The fold lines divide the sheet of piezoelectric material into four leaves 142, 144, 146, and 148. Leaf 142 functions as a spacer and defines an aperture 150 for the film notch sensor and eight apertures 152 for the film speed sensor. Leaf 144 carries a patterned electrode 154 for the acoustic emitter of the film notch sensor and a patterned electrode 156 for the acoustic emitters of the film speed sensor.

Leaf 146 defines an extension 158 having a patterned electrode 160 for the audible acoustic signal transducer. Leaf 146 also carries a patterned electrode 162 for the acoustic sensor of the film notch sensor and eight patterned electrodes 164 for acoustic sensors of the film speed sensor.

Leaf 148, when folded over the receiver transducers on leaf 146, provides shielding from electromagnetic interference. Leaf 148 has an extension tab 165 for providing electrical contact to the backside electrode as described below. The electrical conductors to the patterned electrodes are grouped in one area of the sheet 134, along fold line 138 for convenient connection to an external circuit by a flat connector of the type shown above in FIG. 5.

To assemble the transducer, leaf 142 is folded back and to the right, as seen in FIG. 9, so that the apertures 150 and 152 are substantially aligned with the electrodes 154 and 156 on leaf 144. Next, leaf 146 is folded back and to the left along line 138, so that electrodes 162 and 164 are substantially aligned with electrodes 154 and 156 on leaf 144, with apertures 150 and 152 sandwiched in between. Then, leaf 148 is folded along line 140 to cover electrodes 162 and 164. Finally, tab 165 is folded over edge 138. The surfaces of the sheet 134 that contact each other are fixed with adhesive in the manner described above. The folded and stacked assembly is then fixed to the back of a portion of the camera defining the cartridge receiving chamber.

Figure 10:
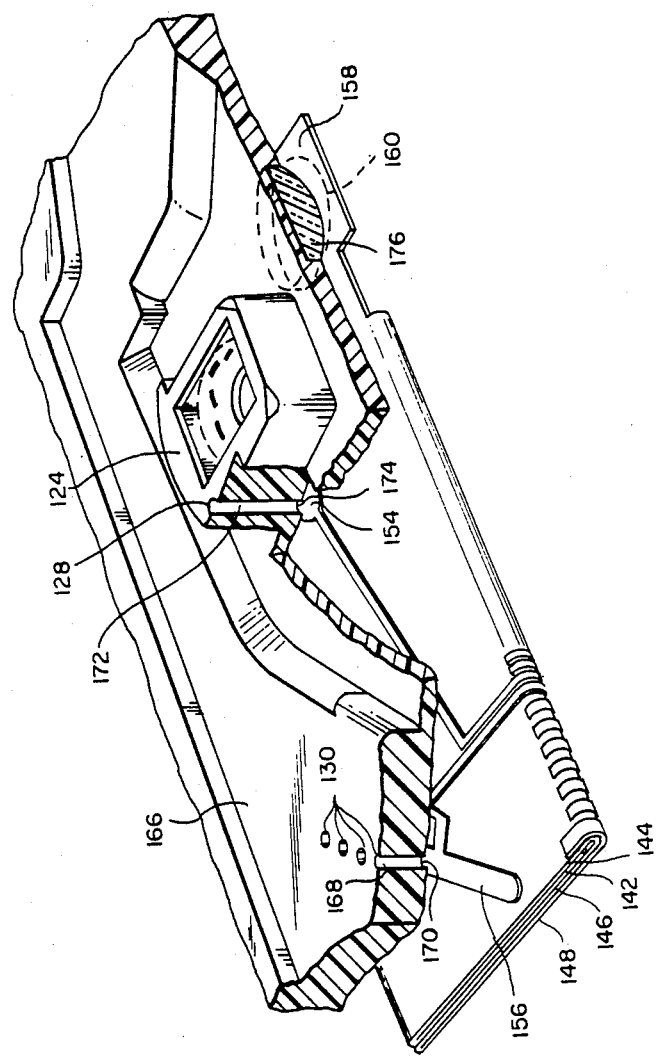
FIG. 10 is a perspective partial cross-sectional view of the acoustic transducers shown in FIG. 7.

FIG. 10 is a perspective view of the integrated acoustic position sensing apparatus broken away to reveal the various acoustic transducers therein. A portion of the camera body 166 formed, for example by injection molded plastic, defines the acoustic resonators for the acoustic measurement apparatus.

The film speed sensor comprises a row of eight cylindrical holes 168 defining sensing ports 130 on one side of the body 166 and transducer ports 170 on the opposite side of the body 166. The stacked, folded polymeric piezoelectric material is fixed, for example by adhesive, to the surface of the body portion 166 over the transducer ports 170 so that the transmitter electrode 156 and the receiver electrodes 164 (not shown in FIG. 10) are aligned with the transducer ports.

The film notch sensor comprises a cylindrical hole 172 through a side wall of lens block 124. The opening into the film receiving chamber defines sensing port 128, and the opening 174 on the other side of body 166 defines the transducer port. Electrodes 154 and 162 (not shown in FIG. 10) are fixed over transducer port 174.

The audible signal transducer defined by electrode 160 is fixed over a dome-shaped piece of foam plastic 176 that is inset into a cylindrical depression in body portion 166.

Figure 11:
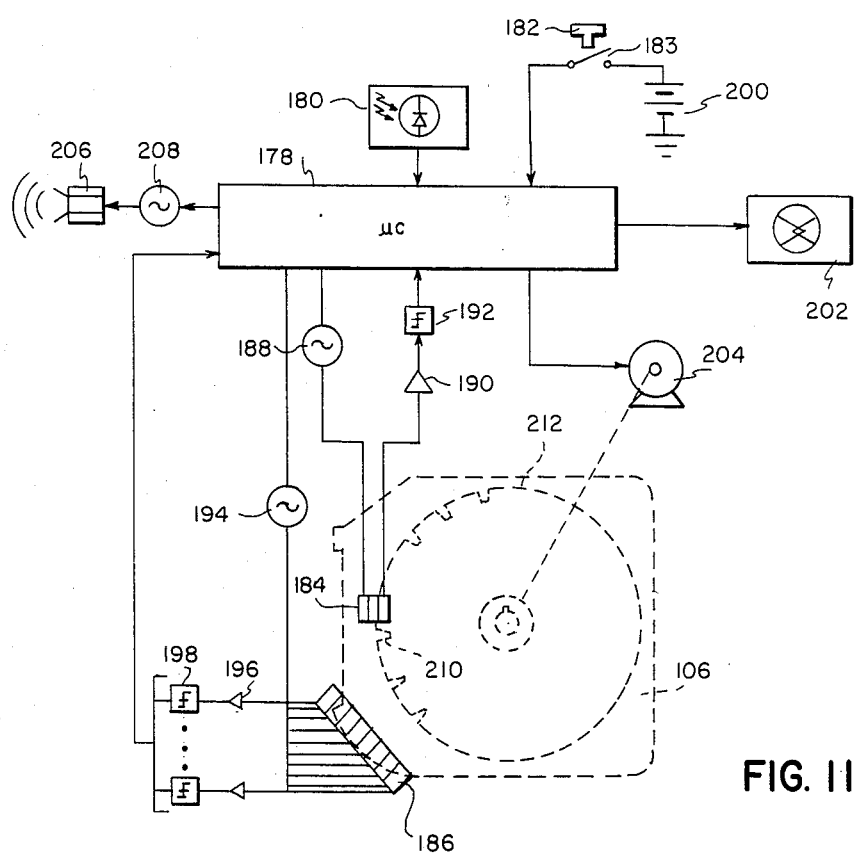
FIG. 11 is an overall schematic diagram of the control circuit for the acoustic transducers shown in FIG. 10.

An overall schematic diagram of the camera control electronics including the integrated acoustic transducers according to the present invention, is shown in FIG. 11. The camera is controlled by a microcomputer 178 programmed in a conventional manner for controlling the operation of the camera. The microcomputer receives input signals from a conventional light measuring circuit 180, a shutter release button 182, the film notch sensor 184, and the film speed sensor 186. Shutter release button 182 operates a switch 183 that supplies power to the microcomputer via a battery 200.

The film notch sensor 184 is driven by an oscillator 188. The signal produced by the sensor is amplified by an amplifier 190 and the output of the amplifier is supplied to a Schmidt trigger 192 to produce a logic level indication of the presence or absence of a film notch at the sensing port of the transducer. The logic level signal is supplied to the microcomputer 178. The acoustic emitter transducer of film speed sensor 186 is powered by an acoustic frequency oscillator 194. The eight acoustic receiver transducers are connected respectively to eight amplifiers 196 and the outputs of the amplifiers are supplied respectively to eight Schmidt triggers 198 to develop logic level signals for the microcomputer.

In response to the signals received by the input transducers, the microcomputer controls a shutter/aperture actuator 202, a film advance motor 204, and the audible signal generator 206. The audible signal generator 206 is supplied by an audible frequency signal from oscillator 208.

When shutter release button 182 is depressed, the microcomputer receives power and proceeds to command the light measuring circuit 180 to measure scene light. The computer commands the film speed sensor to measure the film speed, then calculates a desired exposure based on the film speed and scene light in a known manner. If the light is too low for a satisfactory exposure, the computer activates the audible signal generator to warn the photographer of a low light situation. If scene light is sufficient for exposure, the computer 178 commands the shutter/aperture acuator 202 to open the shutter for a prescribed period of time. The computer then commands the film advance motor 204 to advance film to the next frame. When the film notch sensor 184 senses the next film notch 210 on the periphery of the film disc 212, the motor 204 is stopped and the computer waits for the next actuation of shutter release button 182.

The acoustic transducers for acoustic position sensing apparatus according to the present invention are simply constructed by forming electrodes on opposite sides of a sheet of piezoelectric material. The acoustic transducers are advantageous in improving the mass producability of the acoustic position sensing apparatus for use in mass produced apparatus. They are also beneficial in that the transducers are very compact and can be readily miniaturized for use in apparatus.

The invention has been described with reference to particular embodiments, modifications and variations can be made within the spirit and scope of the following claims. For example, although the acoustic position sensing apparatus has been described with reference to amplitude detection of an acoustic signal, it will be obvious to one skilled in the art that phase detection can also be employed.

I claim:

1. Acoustic position sensing apparatus of the type for sensing the position of an object with respect to a sensing port in an acoustic resonator; the apparatus including acoustic transducer means for generating an acoustic signal of a predetermined frequency in the resonator and for sensing the acoustic signal in the resonator, the sensed signal having a component representing the position of the object with respect to the sensing port; characterized by said acoustic transducer means comprising a sheet of poled piezoelectric material having electrodes on opposite sides thereof, said sheet being fixed over a transducer port in said acoustic resonator.

2. The invention claimed in claim 1, wherein said generating transducer means and said sensing transducer means are integrated on a single sheet of piezoelectric material.

3. The invention claimed in claim 1, wherein said piezoelectric material comprises polyvinylidene fluoride.

4. The invention claimed in claim 2, wherein said single sheet of piezoelectric material is folded so that said generating and sensing transducer means are positioned one on top of the other, and said folded sheet is fixed over a single transducer port.

5. The invention claimed in claim 1, further comprising means for shielding said sensing transducer means from electromagnetic interference.

6. The invention claimed in claim 5, wherein said sheet of piezoelectric material comprising said sensing transducer means includes a substantially unpatterned ground electrode on one side thereof, and said electromagnetic interference shielding means comprises a flap of said sheet folded over said sensing transducer means, whereby said substantially unpatterned ground electrode provides said electromagnetic interference shielding.

7. In a photographic camera, a film sensor comprising:
   means defining an acoustic resonator having one or more transducer ports and a sensing port located in the film path of said camera so as to be covered and uncovered by the film the resonant frequency of said acoustic resonator varying as a function of the position of the film with respect to said sensing port;
   generating transducer means for generating an acoustic signal in said acoustic resonator;
   sensing transducer means for sensing said acoustic signal in said resonator and for producing an electrical signal in response thereto said generating transducer means and said sensing transducer means comprising a sheet of poled piezoelectric material having electrodes on opposite sides thereof, fixed over said transducer port in said resonator; and
   circuit means responsive to the signal produced by said sensing transducer means for producing a signal representing the position of said film with respect to said sensing port.

8. The invention claimed in claim 7, wherein said film sensor comprises a film notch sensor for locating film frames in said camera.

9. The invention claimed in claim 7, wherein said acoustic signal generating means and said acoustic signal sensing means are integrated on a single sheet of piezoelectric material.

10. The invention claimed in claim 7, wherein said piezoelectric material comprising said sensing transducer means is disposed on top of said piezoelectric material comprising said generating transducer means to form a stacked transducer, said stacked transducer being fixed over a single transducer port.

11. The invention claimed in claim 10, wherein said piezoelectric material comprising said generating transducer means and said sensing transducer means are integrated on a single sheet of piezoelectric material that is folded so that said sensing transducer means is on top of said generating transducer means.

12. The invention claimed in claim 9, further comprising means for shielding said sensing transducer means from electromagnetic interference.

13. The invention claimed in claim 12, wherein said shielding means comprises a flap of said piezoelectric material having a ground electrode on one side thereof, said flap being folded over said sensing transducer means for providing said shielding means.

14. In a photographic camera, a film cartridge feature sensor, comprising:
   means defining an acoustical resonator having one or more transducer ports and a sensing port located within a film cartridge receiving chamber of the camera so as to be covered or uncovered by a film cartridge feature;

acoustic signal generating transducer means for generating an acoustic signal of a predetermined frequency in said resonator;

acoustic signal sensing transducer means for sensing an acoustic signal in said resonator and producing a signal in response thereto said acoustic signal generating and sensing transducers comprising a sheet of poled piezoelectric material having electrodes formed on both sides of said sheet and being fixed over said transducer port; and signal processing means responsive to the signal produced by said sensing transducer means for producing a signal indicative of the position of said film cartridge feature.

15. The invention claimed in claim 14, wherein said film cartridge feature sensor comprises a notch sensor for sensing film speed notches on a film cartridge.

16. The invention claimed in claim 14, wherein said acoustic signal generating transducer means and said acoustic signal sensing transducer means are integrated on a single sheet of piezoelectric material.

17. The invention claimed in claim 14, wherein said piezoelectric material comprising said acoustic signal sensing transducer means is positioned on top of said acoustic signal generating transducer means to form stacked transducer means, and said stacked transducer means is fixed over a single transducer port in said acoustic resonator.

18. The invention claimed in claim 17, wherein said generating and sensing transducer means are integrated on a single sheet of piezoelectric material that is folded to form said stacked transducer means.

19. The invention claimed in claim 16, further comprising means for shielding said sensing transducer means from electromagnetic interference.

20. The invention claimed in claim 19, wherein said shielding means comprises a flap of said piezoelectric material having a ground electrode on one side thereof, said flap being folded over said sensing transducer means for providing said shielding means.

21. Integrated acoustic transducer apparatus comprising:

a sheet of poled piezoelectric material having a plurality of electrodes arranged on opposite sides thereof for defining a plurality of acoustic transducers; and a body of material defining a plurality of acoustic resonators, each of said resonators having at least one transducer port and at least one sensor port, said sheet of piezoelectric material being fixed to said body of material such that said acoustic transducers are fixed over said transducer ports.

22. The invention claimed in claim 21, wherein said piezoelectric material comprises polyvinylidene fluoride film.

23. The invention claimed in claim 21, wherein said integrated acoustic transducer apparatus comprises a plurality of acoustic position sensors each having an acoustic signal generating transducer and an acoustic signal sensing transducer.

24. The invention claimed in claim 23, wherein the acoustic signal sensing transducers are disposed over the acoustic signal generating transducers by folding said sheet, and pairs of acoustic signal generating and sensing transducers thus formed are fixed over respective transducer ports.

25. In an acoustic position sensing apparatus of the type having means defining an acoustic resonator with a sensing port, position sensing being made relative to said sensing port, acoustic signal generating transducer means for generating an acoustic signal in said resonator, acoustic signal sensing transducer means for sensing an acoustic signal in said resonator, and detector means responsive to the signal produced by said sensing transducer means for producing a signal having a component representing the position of the object being measured with respect to said sensing port, the improvement comprising:

said acoustic signal generator transducer means comprising a sheet of piezoelectric material having electrodes on opposite sides thereof and being fixed over a transducer port in said resonator; and said acoustic signal sensing transducer means comprising a sheet of piezoelectric material having electrodes on opposite sides thereof and being fixed over said transducer port and overlying said acoustic signal generating transducer means.

26. The invention claimed in claim 25, further comprising spacer means disposed between said acoustic signal generating transducer means and said acoustic signal sensing transducer means.

27. The invention claimed in claim 26, wherein said acoustic signal generating transducer means and said acoustic signal sensing transducer means are integrated on a single sheet of piezoelectric material, said sheet being folded so that said transducer means are positioned on top of each other and wherein said spacer means comprises a flap of said sheet defining a hole substantially the size of said transducer means, said flap being folded so as to be positioned between said generating transducer means and said sensing transducer means.

28. The invention claimed in claim 27, further including electromagnetic interference shield means comprising a flap of said sheet of piezoelectric material having a substantially unpatterned ground electrode on one side thereof, said flap being folded over said acoustic signal sensing transducer means.

29. The invention claimed in claim 27, wherein a plurality of acoustic position sensing devices, are integrated on a single sheet of piezoelectric material.

30. The invention claimed in claim 29, wherein a plurality of acoustic position sensing devices share a common acoustic signal generating transducer.

* * * * *